United States Patent [19]

Osanai

[11] Patent Number: 4,460,136
[45] Date of Patent: Jul. 17, 1984

[54] TAPE-DRIVING APPARATUS FOR A TAPE RECORDER

[75] Inventor: Akira Osanai, Tokyo, Japan

[73] Assignee: Olympus Optical Co., Ltd., Tokyo, Japan

[21] Appl. No.: 421,305

[22] Filed: Sep. 22, 1982

Related U.S. Application Data

[63] Continuation of Ser. No. 169,616, Jul. 17, 1980, abandoned.

[30] Foreign Application Priority Data

Jul. 24, 1979 [JP]  Japan ............................ 54-101951[U]

[51] Int. Cl.³ .......................... G03B 1/04; G11B 15/32
[52] U.S. Cl. ...................................... 242/202; 242/209
[58] Field of Search ................ 242/201, 206, 208–210, 242/202, 198; 226/181, 188, 168; 360/96.2, 96.3, 96.4

[56] References Cited

U.S. PATENT DOCUMENTS

| | | | |
|---|---|---|---|
| 3,409,239 | 11/1968 | Siebert | 242/208 X |
| 3,583,618 | 6/1971 | Lewis | 226/188 X |
| 4,093,151 | 6/1978 | Karsh | 242/198 |

Primary Examiner—Leonard D. Christian

[57] ABSTRACT

A tape recorder has paired reel shafts and paired flywheels. A tape-driving apparatus comprises a motor provided with a drive shaft, flywheel drive pulley and reel shaft drive pulley both fitted to the motor drive shaft and made rotatable therewith, a first endless belt stretched across the paired reel shafts and pressed against the reel shaft drive pulley in one direction, and a second endless belt stretched across the paired flywheels and pressed against the flywheel drive pulley in the opposite direction to the one direction. The force with which the first and second endless belts are pressed against the motor drive shaft is prevented from being applied to the motor drive shaft in the form of a deflecting load.

5 Claims, 2 Drawing Figures

TAPE-DRIVING APPARATUS FOR A TAPE RECORDER

This is a continuation application Ser. No. 169,616, filed July 17, 1980 and now abandoned.

BACKGROUND OF THE INVENTION

This invention relates to a tape-driving apparatus of a tape recorder, and more particularly to a tape-driving apparatus for a tape recorder which comprises a pair of reel shafts and a pair of flywheels.

A tape-driving apparatus for a tape recorder which transports a tape received in a cassette case is generally demanded to carry the tape at a precisely fixed rate. To this end, a drive shaft of a motor is fitted with two pulleys, namely, a flywheel drive pulley and reel shaft drive pulley. The inner wall of a first endless belt stretched across the paired flywheels is pressed against the outer peripheral wall of the flywheel drive pulley. The inner wall of a second endless belt stretched across a tape supply reel shaft and tape take-up reel shaft is pressed against the outer peripheral wall of the reel shaft drive pulley. The rotation of the drive shaft of the motor is transmitted to the tape supply reel shaft and tape take-up reel shaft by means of the reel shaft drive pulley and second endless belt. At this time, the paired flywheels are rotated by means of the flywheel drive pulley and first endless belt.

Irregular rotations of the motor drive shaft which adversely affect the precisely fixed rate of a tape running speed are suppressed by the rotation inertia of the paired flywheels, thereby enabling the tape feed reel shaft and tape take-up reel shaft to be rotated at a mutually fixed speed.

With the conventional tape-driving apparatus, however, the first and second endless belts are respectively pressed against the flywheel drive pulley and reel drive pulley in the same direction relative to the motor drive shaft. Therefore, the prior art tape-driving apparatus has the drawbacks that the abutting force of these endless belts is applied to the motor drive shaft in the form of a deflecting load; this deflecting load causes the drive shaft of the motor to be rotated while revolving around the axis, leading to a greater resistance to the motor rotation and increased power consumption; and such difficulties gives rise to the unstable rotation of the motor driving the first and second endless belts, the irregular rotation of the tape take-up reel shaft and tape supply reel shaft and the occurrence of undesirable variations in the tape-running speed, and further an increased load on the motor with the resultant shortening of its life.

SUMMARY OF THE INVENTION

This invention has been accomplished in view of the above-mentioned circumstnces, and is intended to provide a tape-driving apparatus for a tape recorder, in which the abutting force of the endless belt is prevented from being applied to the motor drive shaft in the form of a deflecting load, thereby enabling a tape to run smoothly at a precisely fixed rate.

According to an aspect of the present invention, there is provided a tape-driving apparatus for a tape recorder having paired reel shafts and paired flywheels, which comprises:

a motor provided with a drive shaft;

rotatable means fitted to the motor drive shaft and made rotatable therewith;

a first endless belt stretched across the paired reel shafts and pressed against said rotatable means in one direction;

a second endless belt stretched across the paired flywheels and pressed against said rotatable means in the opposite direction to said one direction, and wherein the force with which the first and second endless belts are pressed against the motor drive shaft is prevented from being applied to said motor drive shaft in the form of a deflecting load.

DETAILED DESCRIPTION OF THE PREFERRED EMBODIMENTS

Description is given with reference to the accompanying drawing a tape-driving apparatus embodying this invention for a tape recorder.

Figure 1:
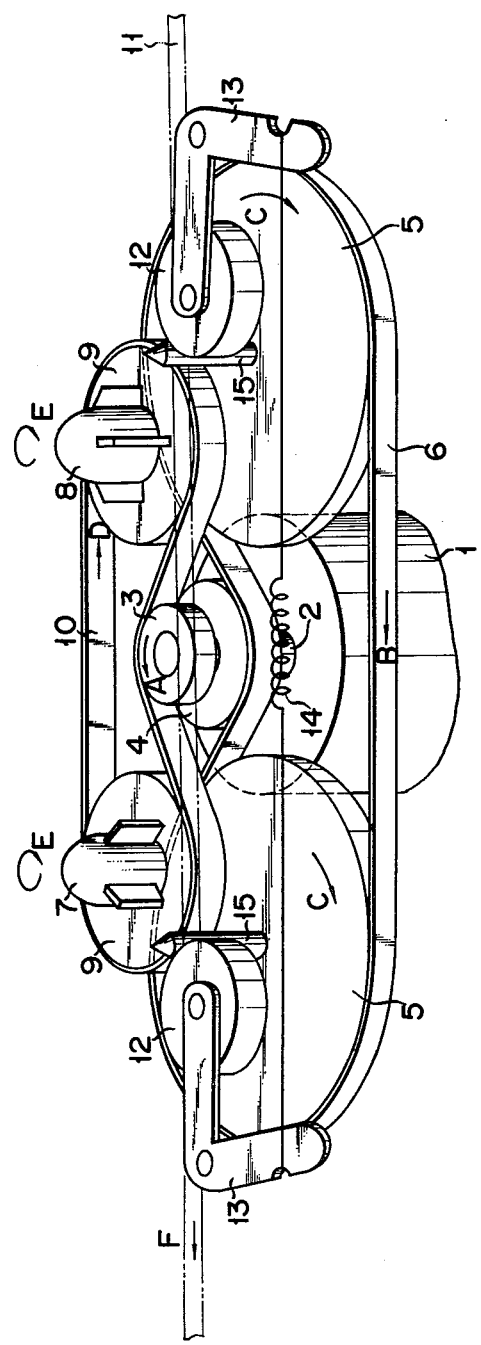
FIG. 1 is a schematic oblique view of a tape-driving apparatus according to one embodiment of this invention for a tape recorder.

FIG. 1 shows the main part of a tape-driving apparatus for a tape recorder. Reference numeral 1 denotes a motor provided with a drive shaft 2. A reel drive pulley 3 and flywheel drive pulley 4 are fitted to the motor drive shaft 2 spatially from each other and concentrically with said motor drive shaft 2 in the order mentioned as counted from the top of said drive shaft 2. When the motor 1 is driven, the reel drive pulley 3 and flywheel drive pulley 4 are rotated in the direction of the indicated arrow A. A pair of rotatable flywheels 5 are set on both sides of the flywheel drive pulley 4.

A first endless belt 6 is stretched across the paired flywheels 5. The outer wall of the first endless belt 6 is pressed against the outer peripheral wall of the flywheel drive pulley 4 in one direction relative to the motor drive shaft 2. Where, therefore, the motor 1 is driven, the first endless belt 6 runs in the direction of the indicated arrow B, and the paired flywheels 5 are rotated in the direction of the indicated arrow C. Inertia resulting from the rotation of the paired flywheels 5 reduces irregularities in the rotation of the motor drive shaft 2.

A tape take-up reel shaft 7 and tape supply reel shaft 8 are set on both sides of the reel drive pulley 3. Both reel shafts 7, 8 are provided with a pair of belt wheels 9 disposed above the paired flywheels 5. The reel drive pulley 3 lies between said paired belt wheels 9. A second endless belt 10 is stretched across the paired belt wheels 9. The outer wall of the second endless belt 10 is pressed against the outer peripheral wall of the reel drive pulley 3 on the opposite side to that part of the outer peripheral wall of the flywheel drive pulley 4 against which the outer wall of the first endless belt 6 is pressed. Where, therefore, the motor 1 is driven, the second endless belt runs in the direction of the indicated arrow D. The tape take-up reel shaft 7 and tape supply reel shaft 8 are rotated in the direction of the indicated arrow E.

The tape take-up reel shaft 7 and tape supply reel shaft 8 are fitted with a pair of one-way clutches (not shown) whicnh are actuated in the opposite directions. Namely, where the reel drive pulley 3 is rotated in the direction of the indicated arrow A, the clutch fitted to the tape take-up reel shaft 7 is actuated to transmit a drive power to said tape take-up reel shaft 7. Conversely, the clutch fitted to the tape supply reel shaft 8 remains unactuated. Therefore, a tape 11 travels in the direction of the indicated arrow F for the desired record, playback or fast forward mode. Where the motor 1 is driven in the reverse direction, then the clutch fitted to the tape take-up reel shaft 7 is left unactuated. Conversely, the clutch fitted to the tape supply reel shaft 8 is actuated to transmit a drive power to said tape supply reel shaft 8. As a result, the tape 11 is rewound in a direction opposite to the direction of the arrow F in which said tape previously travelled.

A pair of capstans 15 are concentrically and rotatably fixed to the paired flywheels 5. A pinch roller 12 is positioned close to each capstan 15 in a state rotatable when contacted by said capstan 15. The tape 11 is clamped betweeen the capstan 15 and pinch roller 12. This pinch roller 12 is fitted to one end of a substantially L-shaped pinch lever 13. This pinch lever 13 is rotatably fitted to a tape recorder body (not shown) at the bent portion of said lever 13. A tension coil spring 14 is stretched between the other end portions of both pinch levers 13. The tension coil spring 14 urges the pinch roller 12 fitted to said one end of each pinch lever 13 in such a direction that said pinch roller 12 can be rotatably contacted by the corresponding capstan 15. The actuation of the pinch lever 13 is controlled by a member corresponding to a selected operation mode. Where all the operation mode members remain unactuated, or a member related to a rewind or fast forward mode is actuated, then the pinch lever 13 is actuated against the urging force of the tension coil spring 14, so that the pinch roller 12 is not rotatably contacted by the capstan 15. Only where a member corresponding to a reproduction or record mode is actuated, then the pinch roller 12 is rotated in contact with the capstan 15.

With a tape driving apparatus according to an embodiment of this invention which is constructed as described above, the first and second endless belts 6, 10 are respectively pressed against the corresponding flywheel drive pulley 4 and reel drive pulley 3 in the opposite directions relative to the motor drive shaft 2. Therefore, the abutting force of both endless belts 6, 10 are reliably prevented from being applied to the motor drive shaft 2 in the form of a deflecting load. For the reason given above, the abutting forces of both endless belts 6, 10 counteract against each other, thereby suppressing the application of the above-mentioned deflecting load to the motor drive shaft 2. Therefore, the tape-driving apparatus of this invention has the advantages that a smaller load is imposed on the motor 1 and a lower resistance is applied to its rotation than in the conventional tape-driving apparatus; the motor 1 consumes less power and is saved from failure; further with the aid of the inertia of the flywheels 5, the motor 1 and its drive shaft 2 are rotated more stably; and consequently the tape 11 is smoothly run at a precisely fixed speed.

Further merits of the tape-driving apparatus of this invention are described below. The flywheel drive pulley 14 is set between the paired flywheels 5, and the reel drive pulley 3 is disposed between the paired belt wheels 9. The flywheel drive pulley 4 is pressed against the outer wall of the first endless belt 6, and the reel drive pulley 3 abuts against the outer wall of the second endless belt 10. Therefore, the first endless belt 6 is stretched over the peripheral edge of each flywheel 5 at a broad angle of contact. Similarly the second endless belt 10 is stretched over the peripheral wall of each belt wheel 9 at a broad angle of contact. Said broad angle of contact enables friction between the first endless belt 6 and flywheel 5, as well as between the second endless belt 10 and belt wheel 9 to be effectively utilized. Therefore, the first and second endless belts 6, 10 are less likely to slip off.

As apparent from the foregoing description, the flywheels 5 and other members are assembled near the motor drive shaft 2. Therefore, the tape-driving apparatus of this invention is rendered compact by such arrangement, and adaptable for use with a small portable tape recorder.

Figure 2:
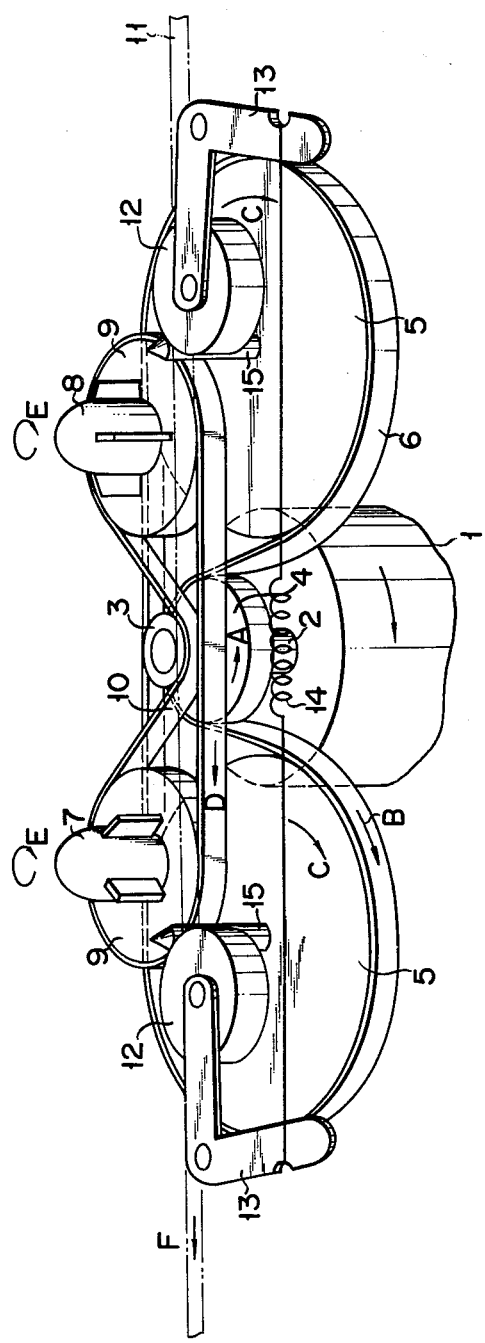
FIG. 2 is a schematic oblique view of a tape-driving apparatus according to another embodiment of the invention for a tape recorder.

It will be noted that this invention is not limited by the above-mentioned embodiment. Namely conversely from said embodiment, the inner walls of the first and second endless belts 6, 10 can be respectively pressed against the outer peripheral walls of the flywheel drive pulley 4 and reel drive pulley 3. Further, the abutment of the first and second endless belts 6, 10 against the flywheel drive pulley 4 and reel drive pulley 3 respectively can be effected as shown in FIG. 2. This arrangement enables the first and second endless belts 6, 10 to be stretched over the peripheral walls of the corresponding pulleys 4, 3 at a broader angle of contact, ensuring a more reliable transmission of the drive power of the motor 1.

What is claimed is:

1. A tape-driving apparatus for a tape recorder having a pair of flywheels which are provided with capstans coaxial therewith, respectively,
    said tape-driving apparatus comprising;
    a motor provided with a drive shaft;
    rotatable means fitted to the motor drive shaft, rotatable therewith and including a first pulley coaxial with said motor drive shaft and a second pulley coaxial with said motor drive shaft
    a first endless belt stretched across the pair of reel shafts and pressed against the outer circumferential surface of the first pulley in one direction; and
    a second endless belt stretched across the pair of flywheels and pressed against the outer circumferential surface of the second pulley in the opposite direction,
    wherein the deflecting forces which the first and second endless belts exert against the motor drive shaft are thereby offset.

2. The tape-driving apparatus according to claim 1, wherein the two pulleys are fixed to said motor drive shaft spatially from each other and concentrically with said motor drive shaft.

3. The tape-driving apparatus according to claim 2, wherein the outer walls of the first and second endless belts are respectively pressed against the outer peripheral walls of the flywheel drive pulley and a reel drive pulley.

4. The tape-driving apparatus according to claim 2, wherein the inner walls of the first and second endless belts are respectively pressed against the outer peripheral walls of the flywheel drive pulley and reel drive pulley.

5. The tape-driving apparatus according to claim 1, wherein said motor drive shaft is located in a space defined by the respective centers of the pair of reel shafts and the respective centers of the pair of flywheels.

* * * * *